United States Patent [19]

Lecourt et al.

[11] Patent Number: 4,889,547
[45] Date of Patent: Dec. 26, 1989

[54] APPARATUS FOR THERMAL BENDING OF GLASS SHEETS

[75] Inventors: Jean Lecourt, Paris, France; Desire Legros, Jemeppe/Sambre; Andre Granville, Auvelais, both of Belgium

[73] Assignee: Saint-Gobain Vitrage "Les Miroirs", Courbevoie, France

[21] Appl. No.: 273,014

[22] Filed: Nov. 18, 1988

[30] Foreign Application Priority Data

Nov. 20, 1987 [FR] France ................ 87 16083

[51] Int. Cl.$^4$ .................................... C03B 23/025
[52] U.S. Cl. .................................. 65/107; 65/106; 65/273; 65/287
[58] Field of Search ................ 65/106, 107, 273, 287

[56] References Cited

U.S. PATENT DOCUMENTS

| | | | |
|---|---|---|---|
| 3,008,270 | 11/1961 | Hohmann et al. | 65/287 X |
| 3,248,517 | 4/1966 | Vranken | 65/107 X |
| 3,697,243 | 10/1972 | Artama | 65/273 |
| 4,755,204 | 7/1988 | Boardman et al. | 65/107 |

FOREIGN PATENT DOCUMENTS 0834623 5/1960 United Kingdom ............ 65/107

Primary Examiner—Arthur Kellogg
Attorney, Agent, or Firm—Oblon, Spivak, McClelland, Maier & Neustadt

[57] ABSTRACT

Disclosed are techniques of heating and bending glass sheets by gravity, in particular for the production of laminated automobile glazings. In the techniques considered, the glass sheet is carried in a horizontal position by a carriage that brings it step by step into the cells of a furnace where it remains successively during its heating. According to the invention, the heat capacity of walls (26) of the cells has a value lower than that of carriage (18) and of the glass sheet. To heat all the glass sheets in the same way and to limit the reaction time of the furnace, the temperature of heating resistors (31) is regulated, and the weight of the carriage to be heated is limited. The latter can advantageously consist of two parts, one of which remains outside the furnace.

5 Claims, 3 Drawing Sheets

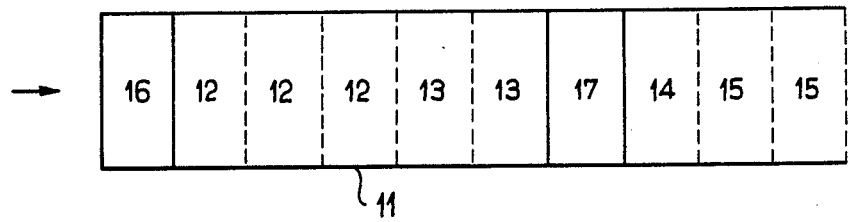
FIG.3
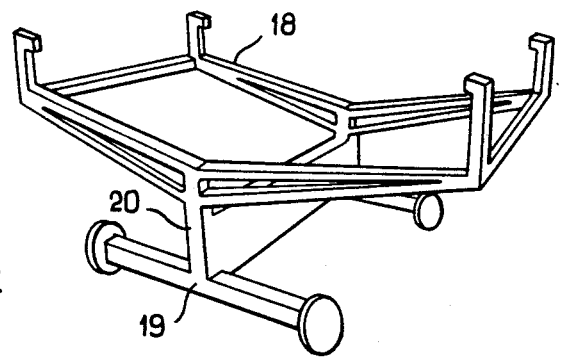
FIG.4
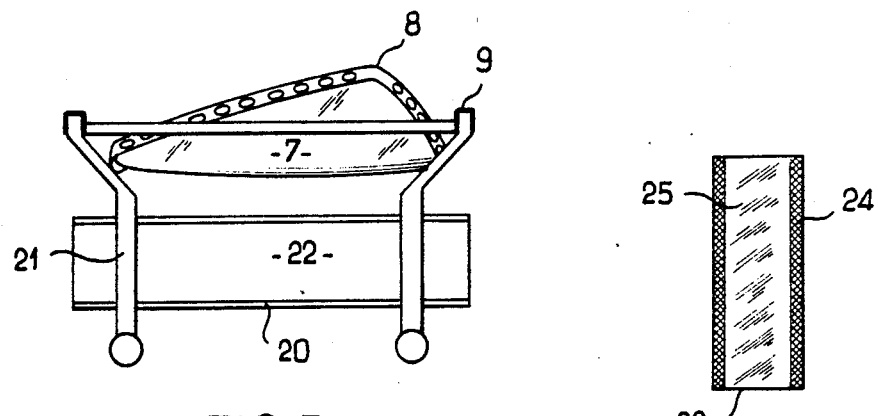
FIG.5
FIG.6

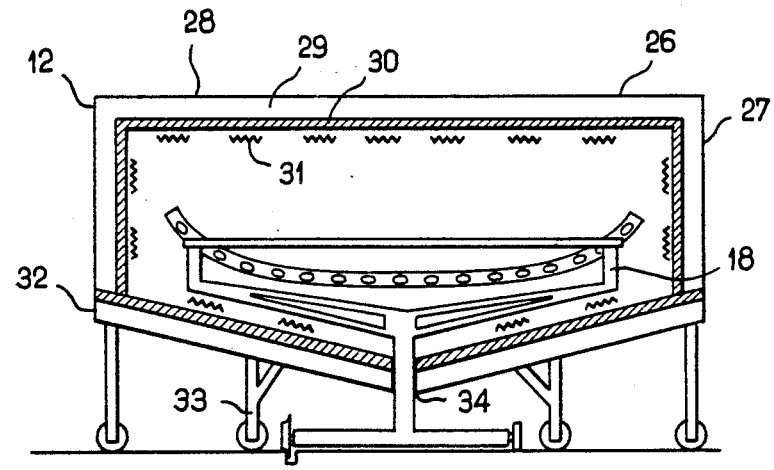
FIG_7
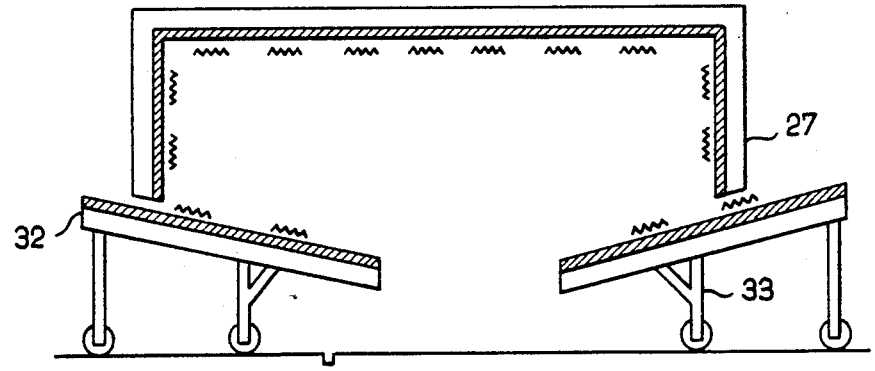
FIG_8

APPARATUS FOR THERMAL BENDING OF GLASS SHEETS

BACKGROUND OF THE INVENTION

1. Field of the Invention

The invention relates to techniques of heating and bending glass sheets by gravity, in particular for the production of laminated automobile glazings.

2. Discussion of the Background

To bend simultaneously glass plates intended to be assembled and then glued with a plastic film, thus constituting a laminated safety glass, currently thermal bending by gravity is used. The same process has also been used to shape unit glass sheets intended to be associated with one or more plastic sheets. Also, an identical process has been used to shape unit glass sheets intended to undergo a thermal tempering treatment.

During the process of bending by gravity, the plane glass sheet or sheets, cut to the desired shape, are placed flat on a carriage consisting of a material supporting high temperatures without deformation—for example, stainless steel. This carriage moves discontinuously in the successive cells of a tunnel furnace; it advances step by step from one cell to the next, staying in each cell for a definite period (i.e., the cycle period). Over the course of time, the temperature of the glass sheet progressively rises until it first reaches then exceeds the transformation temperature. The glass then is deformed by the action of its own weight and approaches a rigid metallic form whose profile it assumes. This form, called a skeleton, can optionally be jointed to facilitate the deformation of the glass or even comprise devices that participate actively in the deformation—as described, for example, in European patent application No. EP 87 40 1344.

The furnace in which the carriages supporting the glass sheets move comprises two types of cells where they stay successively, each cell having its own thermal regulation. They are, in order: preheating cells in which the glass is heated as rapidly as possible, then bending cells where the glass temperature should be finely adjusted in the various zones of the glass sheet to make it possible for it to attain the exact shape desired. During this bending phase, heating elements commonly called "candles" are brought near the glass at varying distances. Thus, by selecting different distances, the various zones of the glass sheet can be heated differently. This device makes it possible not only to obtain varied radii of curvature as in a windshield, for example, but also, by changing the distances between the candles and the glass, from one carriage to the next, to obtain successively bending in different shapes. The great flexibility of this process therefore makes it possible by simple means to produce different models successively at the same installation. But a necessary condition must absolutely be met: the overall temperature of the glass sheet when it enters the first bending zone must be suitable for the process sequence. If it is too low, the energy applied locally during the bending will be insufficient to obtain the desired radii of curvature. If it is too high, even while keeping the candles in their farthest position, it will be impossible to limit sagging of the glass.

It is thus seen that a delicate problem which exists is that of obtaining an adequate temperature for the glass sheet at the exit of the preheating zone. In the case where the glass sheets treated successively are identical, the means usually used to obtain the right temperature at the end of the preheating consists in using a furnace whose cells are equipped at least partially with walls of heavy refractory materials which thus have a high heat capacity and whose temperature stays, because of this, remarkably stable, since the time each carriage remains in a cell is always the same (i.e., is the cycle period). To the extent that the heat quantities to be provided to each mobile system are of the same order, the temperature attained at the end of the cycle, at the exit from the cell, will be the same.

However, when it is desired to produce different glazings in the same furnace, the heat requirements of each mobile system can also be different. Thus, for example, some laminated windshields can consists of a glass 2 mm in thickness associated with another 1.5 mm in thickness, while other windshields will consist of two identical sheets 2.5 mm in thickness. The surfaces of the various models themselves being very different, it is seen that, actually, the weight of the windshield to be produced can vary from 10 kg to 25 kg. If the production series of the same type of windshield is long, the furnace is stabilized and the thermal conditions adapted to each type of glazing can be selected. However, for cars of small series or when the request is very diversified, as in the replacement products market, it can be desired to alternate the production of different models. Likewise, for production reasons, it can be desired to modify instantaneously the production program by introducing or eliminating at the last moment a given windshield in the programmed series. Then it would be necessary to be able to adapt instantaneously the furnace conditions to different products. It is impossible to modify the cycle duration because a change in the cycle would simultaneously affect all the carriages present in the furnace, which are hypothetically different. The solutions usually proposed for the regulation of heating furnaces for glass sheets are generally provided for furnaces where the successive glass sheets are identical, and thus the rates can be modified, for example, by going from one series to another, or the projected holding temperature or the power provided to each cell at the moment a new series arrives in the corresponding cell can be modified. It is even possible, as described for example in European patent No. 0047 682 for a different type of furnace, to anticipate these changes to decrease the furnace reaction time.

It is different if it is desired to produce glazings of different types without being concerned about the order in which they follow each other. Then the regulation processes proposed above have reaction times that are too long to accept significant and random variations in the weight of the glass sheets that follow each other in the furnace. In particular, with furnaces whose cells have walls that consist partially or totally of refractory bricks, the temperature cannot be rapidly adapted and, if a light windshield follows a heavier one, the second will systematically be too hot and vice versa in the opposite case.

SUMMARY OF THE INVENTION

The invention proposes a solution to this problem, and consists in limiting the heat capacity of the furnace walls to a value lower than that of the mobile system consisting of the carriage loaded with its glass sheet. The heat capacity to be considered does not take into account the whole wall because its entire thickness does not participate in heat exchanges. The part of the wall taken into account is limited to a thickness in millimeters equal to $10/\sqrt{\lambda c}$ where c is the specific heat of the wall material and λ its conductivity, c being expressed in Wh/kg.K and λ in W/m.K.

More particularly, this object can be achieved by limiting or even by eliminating all refractory material such as brick or cement from the walls of the cells.

In a complementary way, the invention proposes regulating the heat supply in the furnace enclosure by keeping constant the temperature of the resistors applied on the cell walls.

To shorten the heating time and to facilitate regulation, it is important to limit to the maximum the heat capacity of the mobile system moving in the furnace. This result is obtained by leaving outside the furnace the part of the carriage that provides its transport and includes its rolling means.

The fact of having limited the temperature lag of the furnace cells makes them particularly vulnerable to parasitic thermal effects such as the circulation of cold air. The invention therefore provides locking chambers between, on the one hand, the hot parts of the furnace and, on the other hand, the cold parts: i.e., the outside of the furnace upstream and the colder cell that follows the bending cells downstream.

In one embodiment of the invention, the cold part of the carriage that comprises its rolling means is below the furnace and is connected to the cradle carrying the glass by connecting means going through the floor along a longitudinal slit.

It is provided that this be an element of the carriage itself that makes a tight seal between the inside and outside of the furnace by blocking the slit. Further, it is provided that the furnace floor be mobile in each of its parts located on each side of the slit.

In another embodiment of the invention, to limit to the maximum the inside furnace space, a floor has been provided in two parts located on each side of the slit that have their inside faces inclined so that the lateral walls of the furnace are as low as possible.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 represents the distribution of the cells in a furnace according to the invention, shown in a top view, FIGS. 4 and 5 represent a carriage according to the invention, first alone, in a perspective view, then loaded with its skeleton carrying a bent glazing.

FIG. 6 shows the detail of a portion of FIG. 5.

FIG. 7 shows a cell of a furnace according to the invention where the carriage carrying the glazing is also represented; and FIG. 8 represents the same cell with the floor in open position.

DESCRIPTION OF THE PREFERRED EMBODIMENTS

Although the example used shows a furnace according to the invention that comprises three preheating cells and two bending cells, this example is non-limiting, and the invention relates to furnaces with any number of cells for preheating as well as for bending.

Figure 1:
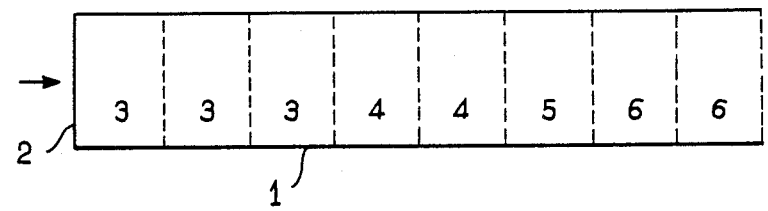
FIG. 1 represents in a top view, diagrammatically, the different cells making up a conventional bending furnace.

FIG. 1 shows the distribution of cells in a conventional furnace for heating and bending two glass sheets intended to be assembled later using a sheet of thermoplastic material to form a laminated windshield. A furnace (1) comprises three preheating zones (3), two bending zones (4) and a blowing zone (5). The role of the blowing cell (5) is to make it possible to create, if desired, on the periphery of the windshield, a zone with a slight prestressing, which provides greater solidity to the annealed glazing once finished. It makes it possible to limit breakages by mechanical shock or thermal stress. The furnace also comprises two cooling zones (6). At the furnace entrance, a door (2) limits heat losses by convection.

Figure 2A:
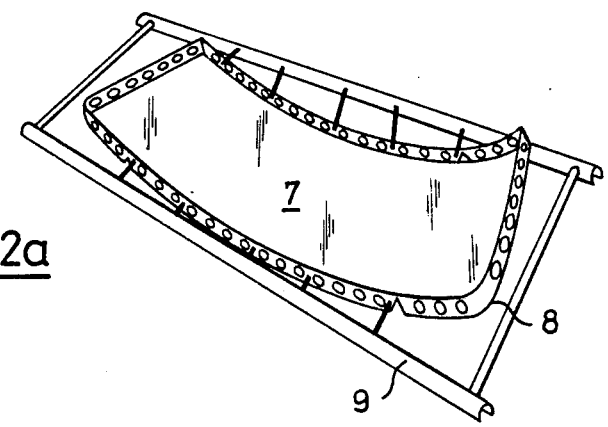
FIG. 2a shows in perspective a bent glazing placed on its skeleton.
Figure 2B:
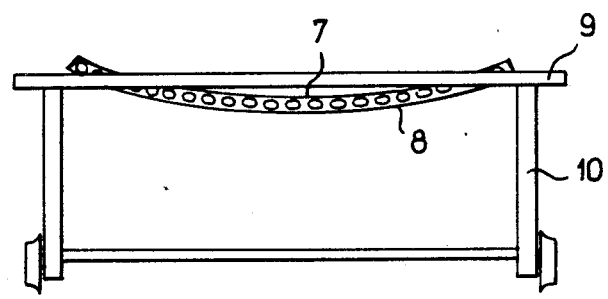
In FIG. 2b, this unit is placed on the carriage that travels in the conventional furnace.

FIGS. 2a and 2b show a metallic form (8) called a skeleton that supports a glass sheet (7). The skeleton 8 is kept in a rigid frame (9) which itself is carried by a carriage (10), its function being to transport the glass sheets from one cell of the furnace (1) to the other during their heating, bending and cooling. The carriage 10 moves generally thanks to wheels carried by rails located on the furnace floor, and it is driven by mechanical means not represented—such as chains or cylinders, for example.

FIG. 3 shows a furnace according to the invention. A furnace (11), chosen by way of example, comprises three preheating cells (12) and two bending cells (13). It also comprises a blowing cell (14) and two cooling cells (15). The cooling cells (12) make it possible to bring the glazing, without risking breakage, to a temperature at which it can be handled.

In one embodiment of the invention, the furnace (11) is also equipped with two lock chambers: first of all a first lock chamber (16) upstream from the preheating, this lock chamber being equipped with two doors that are never open at the same time, thus avoiding cold air currents in the first preheating cell; then a second lock chamber (17), also equipped with two doors which are also never open at the same time. This lock chamber acts as a buffer between the last bending cell, where the glass is the hottest, and a colder cell, for example, the blowing cell (14) where relatively cold air is blown. Here it is also a matter of avoiding the cold air currents that could disturb the thermal operating conditions of a furnace whose temperature lags are slight.

FIG. 4 shows an embodiment of a carriage according to the invention, which comprises a lower part (19) equipped with wheels that is intended to remain permanently outside the furnace and an upper part (18) that constitutes a cradle and that stays in the hot part of the furnace.

In FIG. 5, another example of the carriage is shown. The carriage supports the rigid frame (9) on which the skeleton (8) carrying the glass sheet (7) is located. Between the lower part (19) and the upper part (18) of the carriage, a rigid connection (20), as thin as possible but of a length practically equal to that of the furnace cells, acts to seal the free passage in the wall. The rigid connection (20) consists of two parts: carrying standards (21) and an insulating filler (22). One embodiment of the rigid connection (20) is represented in FIG. 6, wherein two sheet metal boxes (23) are shown at the upper and lower part that house two dense fibrous plates (24) while the center is filled with insulating material (25)—for example, with alumina ceramic fibers with a density of 100 kg/m$^3$.

FIG. 7 represents a view in section of a furnace according to the invention. A preheating cell (12) is seen there in which the upper part (18) travels. The vault (26) and side walls (27) are attached to a framework (not shown). The side walls (27) and the vault (26) have an outside metallic frame (not shown) to which sheet metal (28) is attached that constitutes the outside skin of the furnace. The sheet metal (28) supports the insulating materials. In one particular embodiment, from the outside toward the inside, there is found successively 200 mm of rock wool with a specific weight of 100 kg/m$^3$ (29), then 50 mm of ceramic fiber such as, for example, aluminum silicate, at 100 kg/m$^3$ (30). These fibrous insulators are attached to the walls by conventional means e.g., rods and metallic plates.

The nature of these walls, especially on their inside face, was selected so that the "useful" temperature lag responds to the problem posed. Here useful temperature lag is understood as being the temperature lag of the thickness of the wall that actually participates in the cyclical exchanges between the wall and the colder mass that periodically enters the cell in question.

To determine the thickness in question, calculations were performed according to the Schmidt method as explained in the work "Les fours industriels" [Industrial Furnaces] by W. TRINKS (John Wiley and Sons, New York, French translation: DUNOD, Paris 1957). The example was used of a wall with a homogeneous temperature of 500° C. suddenly plunged into an environment at 100° C., and it was noted that the surface temperature of the wall stabilizes very rapidly (for periods clearly less than one minute) and that the thickness of the material involved in the heat exchanges during the periods of this order remained limited.

For a wall analogous to the one described above, the thickness involved in the exchanges at the end of one minute was 36 mm (taking the coefficient of thermal conductivity, $\lambda=0.13$ watt per meter and Kelvin and the volumetric heat $c=0.29$ watt-hours per kilogram and Kelvin). On the other hand, for a wall of refractory bricks of an alumino-silicate material, this thickness is only 19 mm ($\lambda=0.95$ W/m.K, $c=0.27$ W/kg.K). By way of example, in the two preceding cases, the heat quantities lost by the wall are respectively 46 watt-hours per square meter with the fibrous wall and 398 watt-hours/m$^2$ with the refractory bricks.

It thus appeared necessary to limit the thickness of the wall taken into account for the calculation of the heat capacity to a value that depends on the thermal characteristics of the material, in particular its thermal diffusivity where product $\lambda c$ intervenes. The value in millimeters $e=10\sqrt{\lambda c}$ appeared as most suitable to define the thickness to be considered. For the example considered, it provides, for the fibrous wall, a thickness of 50 mm to be used for the calculation and for the refractory brick wall, of 19 mm precisely.

Continuing the description of FIG. 7, there are seen, attached to the surface of ceramic fibrous material (30), resistors (31) that are directly exposed to the open air.

In the example represented, a floor (32), in two parts, is mobile with the aid of rolling means (33). In a normal position, a slit (34) is almost entirely sealed by the rigid connection (20) that links the cold part and the hot part of the carriage. The floor consists of the same materials as the other furnace walls, and the also comprises resistors.

FIG. 8 represents the furnace with the floor (32). It is seen that, by rolling on its rolling means (33), the floor (32), due to its inclination, moves away from the side walls (27) of the furnace, and the opening thus cleared makes possible simple access to the inside of the furnace to perform maintenance and to remove glass fragments in case of breakage.

In the comparative example that follows, the advantages obtained by the invention will appear clearly.

Assuming a conventional furnace of the type in FIG. 1 (i.e. furnace A), the preheating zones (3) of this furnace have the following inside dimensions:
vault: 2.10 m × 1.25 m
side walls: 1.25 m × 0.90 m
floor: 2.10 m × 1.25 m The materials of the vault and the side walls will be assumed to be identical with those of the furnace according to the invention: 50 mm of ceramic fibers inside, then 200 mm of rock wool. The floor consists of alumino-silicate refractory bricks 80 mm thick on which rest two iron rails with a section 50 mm × 20 mm.

The carriage that travels in furnace A is made of stainless steel, and it weighs 50 kg.

Furnace B, according to the invention, is analogous to FIG. 3. Its preheating cells are analogous to that of FIG. 7, wherein their inside dimensions are:
length: 1.25 m
width: 2.10 m
height: 0.55 m.

The carriage that travels in furnace B consists of an upper part weighing 25 kg.

In furnace A, as in furnace B, the skeleton support and the stainless steel skeleton together weigh 15 kg. It is also assumed that the glazing is the same and that it weighs 15 kg.

The following table summarizes the calculation of the "useful" heat capacities of each of the furnaces:

|  | g W/m.K | c Wh/kg.k | e m | S m$^2$ | P kg/m$^3$ | equivalent weight kg | useful heat capacity Wh/K |
|---|---|---|---|---|---|---|---|
| FURNACE A |  |  |  |  |  |  |  |
| vault | 0.13 | 0.29 | 50 | 2.625 | 91 | 11.9 | 3.46 |
| sidewalls | 0.13 | 0.29 | 50 | 2.25 | 91 | 10.2 | 2.97 |
| floor | 0.95 | 0.27 | 19 | 2.625 | 3 · 10$^3$ | 149.6 | 40.40 |
| rails | — | 0.17 | (2.5 − 10$^3$ m$^3$) |  | 7.7 · 10$^3$ | 19.3 | 3.27 |
| TOTAL FURNACE A | — | — | — | — | — | — | 50.10 |
| FURNACE B |  |  |  |  |  |  |  |
| vault | 0.13 | 0.29 | 50 | 2.625 | 91 | 11.9 | 3.46 |
| sidewalls | 0.13 | 0.29 | 50 | 1.375 | 91 | 6.3 | 1.81 |

-continued

|  | g W/m. K | c Wh/kg. k | e m | S m² | P kg/m³ | equivalent weight kg | useful heat capacity Wh/K |
|---|---|---|---|---|---|---|---|
| floor | 0.13 | 0.29 | 50 | 2.625 | 91 | 11.9 | 3.46 |
| TOTAL FURNACE B | — | — | — | — | — | — | 8.74 |

Concerning the mobile system in each furnace, there are:

|  |  | weight kg | c wh/kg. K | heat capacity wh/K |
|---|---|---|---|---|
| FURNACE A | carriage | 50 | 0.17 | 8.50 |
|  | skeleton | 15 | 0.17 | 2.55 |
|  | glazing | 15 | 0.29 | 4.35 |
| TOTAL FURNACE A |  |  |  | 15.40 |
| FURNACE B | carriage | 25 | 0.17 | 4.25 |
|  | skeleton | 15 | 0.17 | 2.55 |
|  | glazing | 15 | 0.29 | 4.35 |
| TOTAL FURNACE B |  | — | — | 11.15 |

It is seen that furnace B, according to the invention, has a "useful" heat capacity 8.74 Wh/K lower than that of its mobile system, which is 11.5 Wh/K. On the other hand, furnace A, which is conventional, has a "useful" heat capacity of 50.10 Wh/K, which is clearly higher than the actual heat capacity of the mobile system, still higher than that of furnace B, which here is 15.40 Wh/K.

While respecting the conditions proposed by the invention as in the case of furnace B, the dimensions, and therefore the weight and the heat capacity, of the glazing can be modified without the thermal conditions of the furnace being disturbed. Actually, assuming that the glazing has a weight of 20 kg (instead of 15 in the example above), the heat capacity and therefore the heat to be provided to the cold mass increases by $5 \times 0.29 = 1.45$ wh/k—i.e., 13%. The temperature of the resistors will immediately be modified, and the electrical energy drawn for their heating will increase immediately. In furnace A, on the other hand, the refractory mass constitutes a buffer that prevents the regulation from reacting as quickly. In general, an effect of "pumping" the regulation is seen, and thus instability of the thermal conditions that will be able to cause a temperature of the glazing at its exit from the preheating cells that is incompatible with correct bending.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. An apparatus for thermal bending of glass sheets by gravity, said apparatus comprising:
   (a) a mobile system for carrying the glass sheets and transporting the glass sheets in a furnace comprising at least one preheating cell and at least one bending cell, from one cell to another;
   (b) a plurality of electrical resistors placed on an inside surface of the walls of the furnace for providing heating,
   wherein:
   (c) said mobile system comprises carriages each having a cradle that supports the glass sheets and moves in a hot part of the furnace and rolling means connected mechanically to said cradle that remains outside the furnace;
   (d) said rolling means are positioned below said cradle of each of said carriages;
   (e) said cradle and said rolling means of each of said carriages are connected mechanically by a rigid connection the thickness of which in a direction perpendicular to the direction of advance of the carriages is limited to that which is necessary to assure the rigidity of the mobile system;
   (f) said rigid connections is positioned in a longitudinal slit provided in a floor of the furnace;
   (g) said floor comprises two parts, one of which is located on each side of said longitudinal slit; and
   (h) said rolling means includes means for movement in an at least approximately horizontal plane.

2. A device according to claim 1 and further comprising means connected to said carriages for sealing said longitudinal slit.

3. A device according to claim 1 wherein said rigid connection has:
   (a) a length at least approximately equal to the length of each cell and
   (b) a thickness slightly less than that of said longitudinal slit.

4. A device according to claim 3 wherein said rigid connection comprises:
   (a) a plurality of standards for providing rigidity and
   (b) a plurality of filler elements containing insulating materials for occupying said longitudinal slit.

5. A device according to claim 1 wherein said two parts of said floor are located on each side of said longitudinal slit and have an inside face portion inclined relative to horizontal, the lowest sides thereof being close to said longitudinal slit.

* * * * *